US007933402B2

(12) United States Patent
Jeon

(10) Patent No.: US 7,933,402 B2
(45) Date of Patent: Apr. 26, 2011

(54) INTEGRATED ADAPTER AND FAX DEVICE USING THE SAME

(75) Inventor: Cheol-Min Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1373 days.

(21) Appl. No.: 11/438,287

(22) Filed: May 23, 2006

(65) Prior Publication Data

US 2006/0268348 A1 Nov. 30, 2006

(30) Foreign Application Priority Data

May 27, 2005 (KR) ........................ 10-2005-0045202

(51) Int. Cl.
*H04M 1/00* (2006.01)

(52) U.S. Cl. ........ 379/443; 358/400; 358/406; 358/442; 358/443; 358/468; 379/93.05; 379/100.02; 379/167.13; 379/395.01; 379/413.04; 455/557

(58) Field of Classification Search .................. 358/400, 358/406, 442, 443, 468; 379/88.13, 93.05–93.07, 379/100.01–100.17, 167.13, 394–395.01, 379/398, 412, 413–413.04, 441–443; 455/557, 455/558

See application file for complete search history.

(56) References Cited

U.S. PATENT DOCUMENTS 4,652,933 A * 3/1987 Koshiishi ...................... 358/443
5,003,578 A * 3/1991 Lin .......................... 379/102.04
5,065,426 A * 11/1991 Greenstein et al. ...... 379/100.03
5,459,788 A * 10/1995 Kim ......................... 379/399.02
5,905,782 A * 5/1999 Lee et al. ................. 379/100.01
5,905,790 A * 5/1999 Shemula .................. 379/202.01
6,647,102 B2 * 11/2003 Hirai et al. ............... 379/100.01
7,075,682 B1 * 7/2006 Eguchi et al. ................ 358/434
7,463,379 B2 * 12/2008 Shibata ........................ 358/1.15
2004/0129440 A1 * 7/2004 Hayashi et al. ............. 174/52.1

FOREIGN PATENT DOCUMENTS

| | | | |
|---|---|---|---|
| CN | 2161032 | Y | 4/1994 |
| CN | 2174013 | Y | 8/1994 |
| JP | 02-094270 | | 4/1990 |
| JP | 03-252259 | | 11/1991 |
| JP | 08-008952 | | 1/1996 |
| JP | 2001-068233 | | 3/2001 |
| KR | 90-17813 | | 10/1990 |
| KR | 10-0216043 | | 5/1999 |
| KR | 20-0220709 | | 2/2001 |

* cited by examiner

*Primary Examiner* — Hemant Patel

(74) *Attorney, Agent, or Firm* — Roylance, Abrams, Berdo and Goodman L.L.P.

(57) ABSTRACT

An integrated adapter and fax device using the integrated adapter are provided. The power supply converting unit and line interface unit, each of which has a first section and a second section that are isolated from each other, are configured separately in the integrated adapter. Thus, product liability and safety standards are fundamentally satisfied, material costs of an external case of the fax device can be reduced, the external case can be more freely designed, and a power supply line and telephone line can be easily connected by a modular jack.

9 Claims, 3 Drawing Sheets

500 AC 1 AC 2 112 112 111 211 100 DC 1 DC 2 110 210 450 TEL 1 122 122 121 221 200 T1 T2 120 220 130 132 132 231 R1 300 230 R2 TEL 2 EXT 1 140 142 142 241 E1 400 240 EXT 2 E2

600
650
PC INTERFACE UNIT
660
MEMORY UNIT
670
SCANER UNIT
680
PRINTER UNIT
640
CPU
630
MODEM
Tx
Rx
500
DC 1
DC 2
T1
T2
R1
R2
E1
E2
450
100
210
200
220
300
230
400
240
110
120
130
140
AC 1
AC 2
TEL 1
TEL 2
EXT 1
EXT 2

INTEGRATED ADAPTER AND FAX DEVICE USING THE SAME

PRIORITY

This application claims the benefit under 35 U.S.C. §119 (a) of Korean Patent Application No. 10-2005-0045202, filed May 27, 2005, in the Korean Intellectual Property Office, the entire disclosure of which is hereby incorporated by reference.

BACKGROUND OF THE INVENTION

1. Field of the Invention

The present invention relates to an adapter and a fax device using the adapter More particularly, the present invention relates to an adapter that converts an externally supplied alternating current into direct current and a fax device that is supplied with power through the adapter.

2. Description of the Related Art

Generally, a fax device or a multi-function device (hereinafter referred to as a "fax device") performing a fax function is powered by a power supply, and transmits and receives information signals through a telephone line connected to a public switched telephone network (PSTN). A power supply converting unit and a line interface unit are formed within the fax device. The power supply converting unit converts an externally provided alternating current into direct current. The line interface unit interfaces transmit (Tx) and receive (Rx) terminals of a modem with the telephone line.

To satisfy the safety standards of the fax device, the first section and second section of the power supply converting unit and the line interface unit must be isolated from each other. Additionally, the external case of the fax device has to be entirely formed of a non-flammable material that is fireproof.

When the power supply converting unit and the line interface unit are formed within the fax device, production costs are increased since the external case of the fax device must be entirely formed of non-flammable material. Therefore, there is a need for the power supply converting unit and the line interface unit to be formed separately from the fax device.

SUMMARY OF THE INVENTION

The present invention provides an integrated adapter allowing a power supply converting unit and a line interface unit to be formed separately from a fax device, and a fax device using the same.

According to an aspect of exemplary embodiments of the present invention, there is provided an integrated adapter comprising a power supply converting unit for converting an alternating current input through an input terminal of a first section into a direct current and outputting the direct current to an output terminal of a second section. The integrated adapter further comprises a line interface unit comprising a first section connected to a telephone line and a second section transmitting and receiving signals to/from the first section of the line interface unit, wherein the first section and the second section of each of the power supply converting unit and the line interface unit are isolated from each other.

The line interface unit may comprise a tip unit transmitting and receiving a signal through the telephone line of the first section of the line interface unit and a tip terminal of the second section of the line interface unit, and a ring unit sending and receiving a signal through the telephone line of the first section of the line interface unit and a ring terminal of the second section of the line interface unit.

The line interface unit may further comprise an external device terminal unit that has a first section in which an external device terminal is formed that connects the telephone line to an external device, and a second section which monitors whether the external device is connected to the external device terminal.

The integrated adapter may further comprise at least one of a modular jack or a modular plug in which the output terminal and terminals of the second section of the line interface unit are integrally formed.

According to another aspect of exemplary embodiments of the present invention, there is provided a fax device using an integrated adapter formed separately from the fax device, wherein the integrated adapter comprises a power supply converting unit for converting an alternating current input through an input terminal of a first section into a direct current and outputting the direct current to an output terminal of a second section that is isolated from the first section. The fax device further comprising a line interface unit comprising a first section connected to a telephone line and a second section isolated from the first section of the line interface unit and transmitting and receiving signals to/from the first section of the line interface unit, wherein electrical energy is supplied from the second section of the power supply converting unit, signals are transmitted and received to/from the second section of the line interface unit, and an external case of a fax device is flammable.

BRIEF DESCRIPTION OF THE DRAWINGS

The above and other exemplary features and advantages of the present invention will become more apparent by describing in detail certain exemplary embodiments thereof with reference to the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
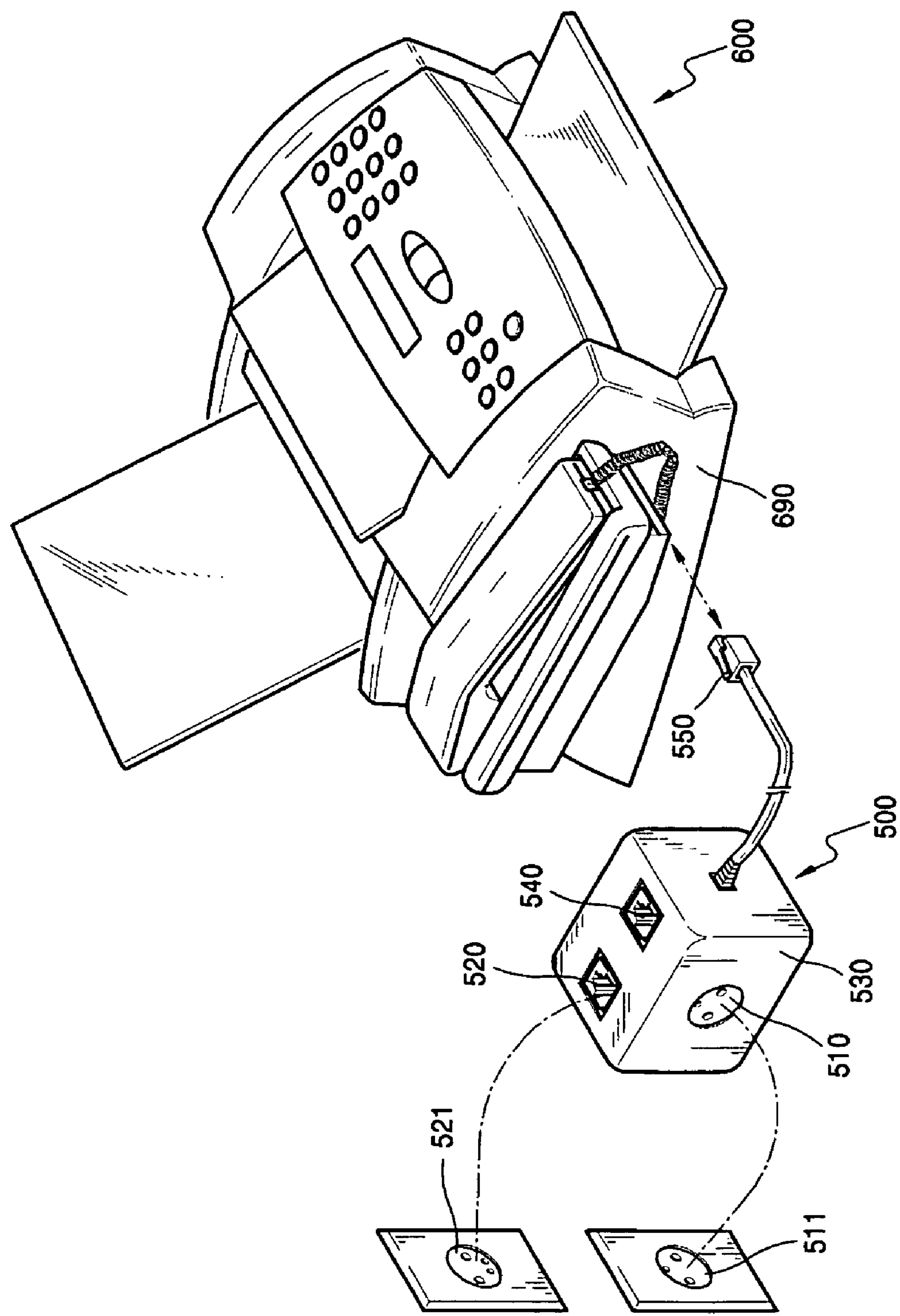
FIG. 1 is a perspective view of an integrated adapter and a fax device according to an exemplary embodiment of the present invention.
Figure 2:
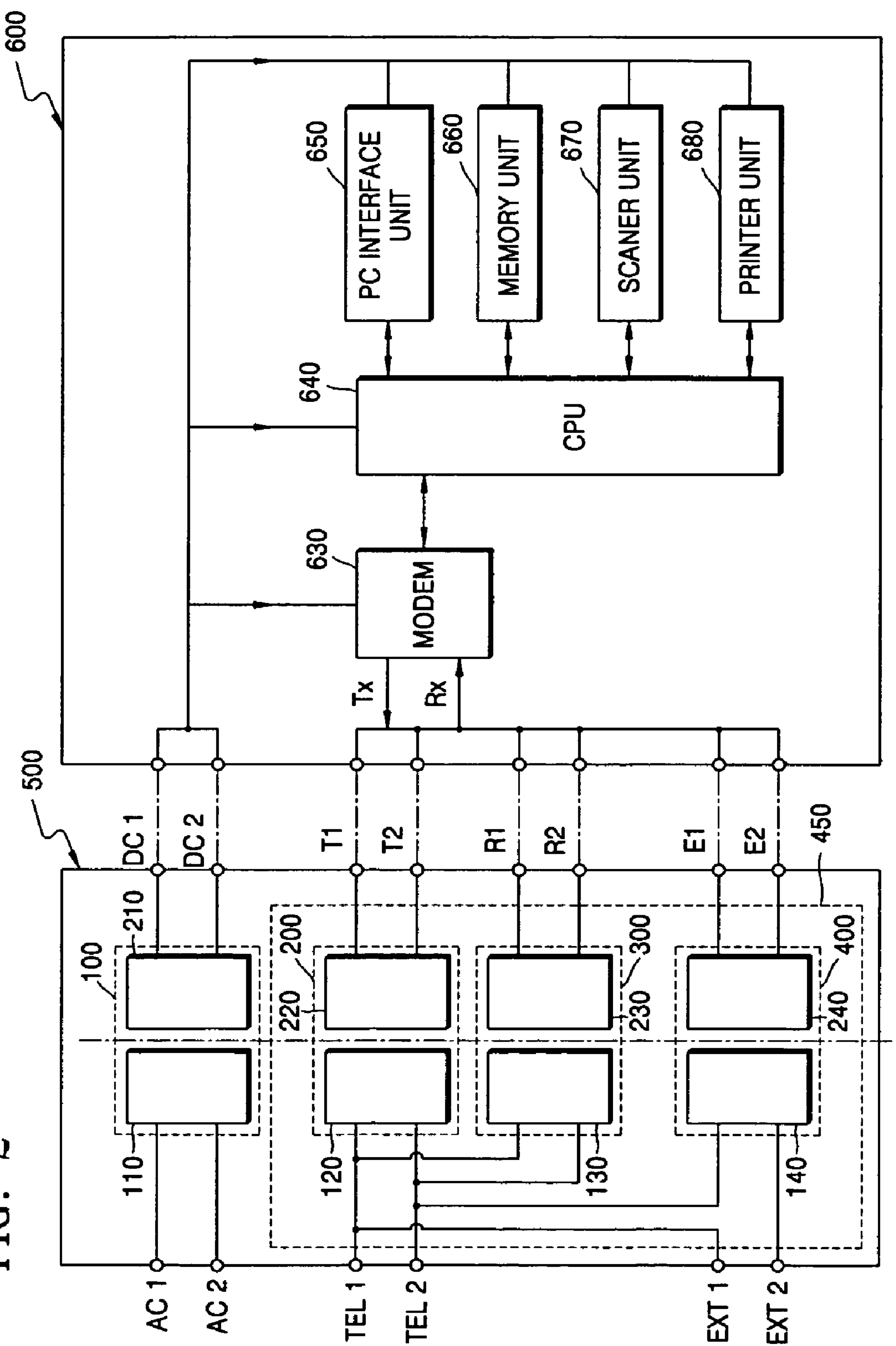
FIG. 2 is a block diagram illustrating inner structures of the integrated adapter and the fax device of the exemplary embodiment of FIG. 1.
Figure 3:
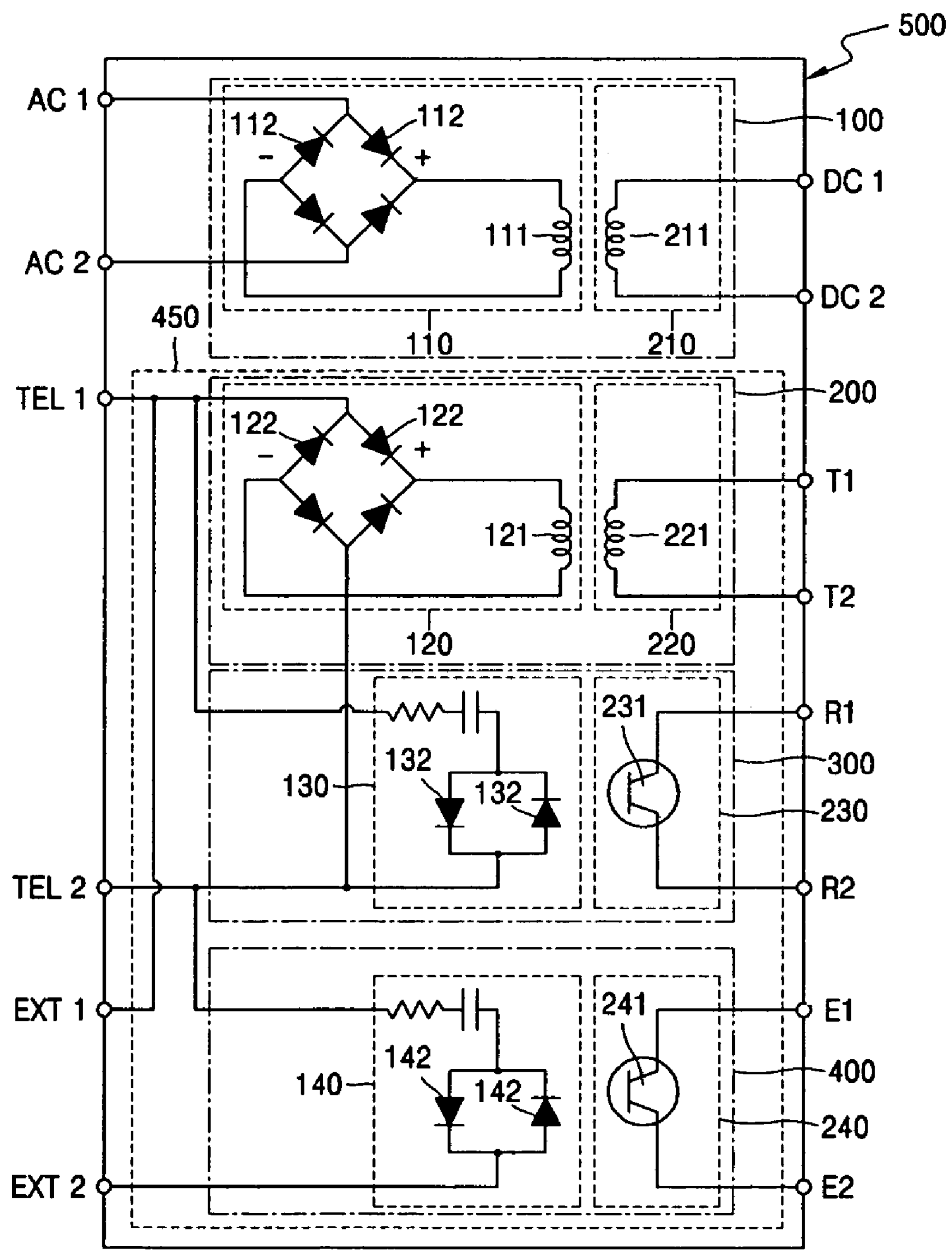
FIG. 3 is a circuit diagram illustrating a power supply converting unit and a line interface unit of the exemplary embodiment of FIG. 1.

FIG. 1 is a perspective view of an integrated adapter 500 and a fax device 600 according to an exemplary embodiment of the present invention. FIG. 2 is a block diagram illustrating inner structures of the integrated adapter and the fax device of the exemplary embodiment of FIG. 1. FIG. 3 is a circuit diagram illustrating a power supply converting unit and a line interface unit of the exemplary embodiments of FIG. 1.

Referring to FIG. 1, the integrated adapter 500 is separately installed outside of the fax device 600. An external case 530 of the integrated adapter 500 comprises a jack 510 for a power supply, a jack 520 for a telephone line, a jack 540 for a terminal of an external device, and a modular plug 550. A first section and a second section of the integrated adapter 500 are electrically isolated. The power supply jack 510, the telephone line jack 520, and an external device jack 540 are formed in the first section of the integrated adapter 500. The modular plug 550 is formed in the second section of the integrated adapter 500.

The power supply jack 510 is connected to a wall outlet 511 to supply external alternating current to the integrated adapter 500. The telephone line jack 520 and the external device jack 540 may be RJ-11 standard jacks. The telephone line jack 520 is connected to an external telephone line 521. The external device jack 540 branches off from the telephone line jack 520 and connects a telephone line to an additional telephone or another fax device. The modular plug 550 transmits direct current and a tip/ring signal to the fax device 600. Although not illustrated, the power supply jack 510, the telephone line jack 520, the external device jack 540, and the modular plug 550 may be replaced by a power supply plug, a telephone line plug, an external device plug, and a modular jack, respectively.

Referring to FIG. 2, the fax device 600 includes a modem 630, a central processing unit (CPU) 640, a personal computer (PC) interface unit 650, a memory unit 660, a scanner unit 670, and a printer unit 680. The CPU 640 comprehensively controls all operations, such as a sending mode, receiving mode, and copying mode of the fax device 600. The modem 630 modulates and demodulates data sent from and received by the fax device 600, respectively. Outgoing data is transmitted to a line interface unit 450 through a Tx terminal, and incoming data is received by the modem 630 through an Rx terminal. The memory unit 660 stores program data, protocol data, scan data, and outgoing/incoming data, and accesses or stores data via the control of the CPU 640. The scanner unit 670 scans images of inputted documents, converts the images into scan data, and provides the scan data to the CPU 640. The modem 630 is controlled by the CPU 640, modulates scan data stored in the memory unit 660 according to fax standards such that the scan data is transmissible, and outputs the scan data through the Tx terminal in the sending mode, and demodulates encoded image signals supplied through a telephone line into original image signals in the receiving mode. The printer unit 680 prints the scan data or receiving data stored in the memory unit 660 on a sheet of print paper via the control of the CPU 640. The PC interface unit 650 interfaces the fax device 600 with a PC such that printing or scanning is possible in the PC.

The line interface unit 450 is connected to a public switched telephone network (PSTN), and forms a signal loop. Furthermore, the line interface unit 450 provides an interface between a tip/ring line that is a telephone line and the modem 630 of the fax device 600. That is, the line interface unit 450 operates in two modes, a ring/telephone mode and a fax mode.

In the ring/telephone mode, the line interface unit 450 transmits and receives a tip/ring signal and enables an external telephone (not shown) connectable to terminals EXT 1 and EXT 2 or a telephone (not shown) connectable to a second section of the line interface unit 450 to be used. Although not illustrated, when the telephone is connected to the terminals EXT 1 and EXT 2 or the second section of the line interface unit 450, a signal line between the telephone and the modem 630 is not completely disconnected. Audio signals sent from and received by the telephone are transmitted not only to telephone line terminals TEL 1 and TEL 2 through the line interface unit 450, but also to the modem 630 through the Rx terminal. However, when the line interface unit 450 is in a ring/telephone mode, the modem 630 doesn't process the audio signals received through the Rx terminal.

In the fax mode, fax data can be sent and received through the modem 630. The line interface unit 450 comprises a mode switching circuit (not shown), such as a CML (Connect Modem to Line) relay, for switching the ring/telephone mode to the fax mode. When in a standby state, the fax device 600 is changed to the ring/telephone mode using the mode switching circuit, and when in use, the fax device 600 is changed to the fax mode. When an external ring/tip signal is input through the line interface unit 450, the CML relay switches a telephone (not shown), and when the telephone is off-hook, the ring/telephone mode is maintained to send and receive audio signals. If the telephone is not picked up for a number of ring/tip signal rings, the CML relay switches the modem 630 and enables the ring/tip signal to be transmitted to the modem 630 so that the fax mode in which fax data can be sent and received is used.

The integrated adapter 500 comprises a power supply converting unit 100 and the line interface unit 450. The line interface unit 450 comprises a tip unit 200 and a ring unit 300. The line interface unit 450 may further comprise an external device terminal unit 400. The power supply converting unit 100, the tip unit 200, the ring unit 300, and the external device terminal unit 400 have first sections 110, 120, 130 and 140, respectively, and second sections 210, 220, 230 and 240, respectively, that are electrically isolated from each other.

Electrical energy is transmitted from the first section 110 to the second section 210 of the power supply converting unit 100 through a transformer (referring to FIG. 3). Reference numerals 111 and 211 denote a first section and second section of the transformer, respectively. Power supply terminals AC 1 and AC 2 apply external alternating current to the first section 110 of the power supply converting unit 100. Output terminals DC 1 and DC 2 apply a direct current from the second section 210 of the power supply converting unit 100 to the fax device 600.

The first section 120 of the tip unit 200 is connected to telephone terminals TEL 1 and TEL 2. The second section 220 of the tip unit 200 comprises tip terminals T1 and T2. The first section 130 of the ring unit 300 is connected to the telephone terminals TEL 1 and TEL 2. Each of the TEL 1 and TEL 2 terminals transmits the ring or tip signal of the telephone line. The second section 230 of the ring unit 300 comprise ring terminals R1 and R2. The tip terminals T1 and T2 and the ring terminals R1 and R2 are connected to the Tx and Rx terminals of the modem 630, and transmit the ring signal and the fax data. The line interface unit 450 may further comprise the external device terminal unit 400. The first section 140 of the external device terminal unit 400 comprises external device terminals EXT 1 and EXT 2 connected to the telephone terminals TEL 1 and TEL 2. Terminals E1 and E2 of the second section 240 of the external device terminal unit 400 are connected to the modem 630 and the CPU 640, and monitor whether an external device is connected to the external device terminals EXT 1 and EXT 2 of the first section 140. While the first section 120 and the second section 220 of the tip unit 200 are electrically isolated from each other, the tip signal is transmitted between the first section 120 and the second section 220 through a transformer (referring to FIG. 3)

in order to match line impedance. Reference numerals 121 and 221 denote a first section and a second section of the transformer, respectively.

FIG. 3 is a circuit diagram illustrating the power supply converting unit 100 and the line interface unit 450 of the integrated adapter 500 of FIG. 1. Referring to FIG. 3, the first section 110 of the power supply converting unit 100 includes a bridge rectifier 112 that rectifies alternating current to direct current. The transformer, through sections 111 and 211, transforms an AC input voltage, for example, between 100 and 250 V, into a DC supply voltage of, for example, 5, 10, 12 or 24 V.

In the exemplary implementations, the tip signal input through the telephone lines TEL 1 and TEL 2 is connected to the bridge rectifier 122 and then rectified. The rectified tip signal is converted into a signal with a specific voltage by the transformer, through sections 121 and 221, and then transmitted to the tip terminals T1 and T2 of the second section 220 of the tip unit 200. However, the transmission of the tip signal is not limited to the above configuration, and the tip signal can be transmitted and received between the first section 120 and the second section 220 of the tip unit 200 in various ways. Furthermore, implementation of such transmission methods is well known to those of ordinary skill in the art, and thus detailed descriptions thereof will not be provided.

According to exemplary embodiments of the present invention, the ring unit 300 includes a photo coupler or relay (not shown) of which a first section 130 and a second section 230 are isolated. A light emitting unit 132 and a light receiving unit 231 of the photo coupler are electrically isolated from each other. The light emitting unit 132 comprises light emitting diodes. The light receiving unit 231 may comprise a phototransistor. For convenience of explanation, the light emitting unit 132 is installed in the first section 130 and the light receiving unit 231 is installed in the second section 230 of the ring unit 300 in FIG. 3. However, transmission of the ring signal is not limited to the above configuration, and the ring signal can be transmitted and received between the first section 130 and the second section 230 of the ring unit 300, which are isolated from each other in various ways. Furthermore, implementation of such transmission methods is well known to those of ordinary skill in the art, and thus detailed descriptions thereof will not be provided.

According to exemplary embodiments of the present invention, the external device terminal unit 400 comprises a photo coupler or relay (not shown) of which a first section 140 and a second section 240 are divided. For convenience of explanation, a light emitting unit 142 is installed in the first section 140 and the light receiving unit 241 is installed in the second section of the external device terminal unit 400 in FIG. 3. However, the transmission of signals is not limited to the above configuration, and signals can be transmitted and received between the first section 140 and the second section 240 of the external device terminal unit 400, which are isolated from each other in various ways. Moreover, implementation of such transmission methods is well known to those of ordinary skill in the art, and thus detailed descriptions thereof will not be provided.

A plug unit 550, such as a modular plug, a power supply plug, a telephone line plug, an external device plug, and a modular jack, among others, can be used to simultaneously connect and disconnect all of the terminals installed in the second section of the integrated adapter 500 to and from the fax device 600. Referring to FIGS. 1 and 2, the second section of the integrated adapter 500 may be connected to the fax device 600 by a modular jack (not shown) in which the output terminals DC 1 and DC 2 and the terminals of the second section of the line interface unit 420 are integrated. Instead of the modular jack, a single modular plug 550 can be used or a plurality of modular jacks or modular plugs 550 may be used.

The fax device 600 according to exemplary embodiments of the present invention comprises the integrated adapter 500, and is provided with electrical energy from the second section 210 of the power supply converting unit 100, sends and receives fax data through the second section of the line interface unit 450, and includes an external case 690 formed of a flammable material.

Since the power supply converting unit 100 and the line interface unit 450 are formed in the integrated adapter 500 that is provided separately from the fax device 600, according to safety standards, only the material of the external case 530 of the integrated adapter 500 is restricted. The material of the external case 690 of the fax device 600 is not restricted. Thus, the external case 690 of the fax device 600 can be formed of relatively inexpensive material. Since the power supply converting unit 100 and the line interface unit 450 that are strictly restricted according to safety standards are installed separate from the fax device 600, the design of the external case 690 of the fax device 600 can be compact and aesthetic.

As described above, according to exemplary embodiments of the present invention, an integrated adapter and a fax device using the integrated adapter have the following advantages:

First, a power supply converting unit and a line interface unit, each of which comprises a first section and a second section that are electrically isolated from each other, are formed in an adapter separately from a fax device, thus fundamentally satisfying safety standards.

Second, since the power supply converting unit and the line interface unit are installed separately from the fax device, a material used to form an external case of the fax device does not need to be restricted. Therefore the material costs can be reduced, and the design of the external case can be compact and aesthetic.

Third, since output terminals and second section terminals of the line interface unit are integrated into a modular jack, a power supply line and a telephone line can be easily connected to the fax device.

While the present invention has been particularly shown and described with reference to certain exemplary embodiments thereof, it will be understood by those of ordinary skill in the art that various changes in form and detail may be made therein without departing from the spirit and scope of the present invention as defined by the following claims and equivalents thereof.

What is claimed is:

1. An integrated adapter comprising:

a power supply converting unit for converting an alternating current input through an input terminal of a first section into a direct current and outputting the direct current to an output terminal of a second section; and a line interface unit for providing an interface between modems of a telephone and a fax device and comprising a first section connected to a telephone line and a second section transmitting signals to and receiving signals from the first section of the line interface unit, wherein the first section and the second section of each of the power supply converting unit and the line interface unit are isolated from each other, and the power supply converting unit and the line interface unit are integrally formed.

2. The integrated adapter of claim 1, wherein the line interface unit further comprises:

a tip unit for transmitting and receiving a signal through the telephone line of the first section of the line interface unit and a tip terminal of the second section of the line interface unit; and a ring unit for sending and receiving a signal through the telephone line of the first section of the line interface unit and a ring terminal of the second section of the line interface unit.

3. The integrated adapter of claim 2, wherein the tip unit comprises a transformer.

4. The integrated adapter of claim 2, wherein the ring unit comprises at least one of a photo coupler and a relay.

5. The integrated adapter of claim 2, wherein the line interface unit further comprises an external device terminal unit comprising a first section in which an external device terminal connects the telephone line to an external device and a second section which monitors whether the external device is connected to the external device terminal.

6. The integrated adapter of claim 5, wherein the external device terminal unit comprises at least one of a photo coupler and a relay.

7. The integrated adapter of claim 1, further comprising at least one of a modular jack and a modular plug in which the output terminal and terminals of the second section of the line interface unit are integrally formed.

8. The integrated adapter of claim 7, further comprising an external case comprising non-flammable material.

9. A fax device comprising:

a fax body comprising at least one modem and an outer case formed of a flammable material; and an integrated adapter separated from the fax body, wherein the integrated adapter comprises:

a power supply converting unit for converting an alternating current input through an input terminal of a first section into a direct current and outputting the direct current to an output terminal of a second section that is isolated from the first section; and a line interface unit for providing an interface between modems of a telephone line and a fax device, comprising a first section connected to the telephone line and a second section isolated from the first section and connected to the modem of the fax device, and integrally formed with the power supply converting unit, wherein the fax body receives power supply from the second section of the power supply converting unit, and transmits and receives signals to and from the second section of the line interface unit.

* * * * *